March 11, 1924.
A. L. WARNER
GATE BOX
Filed March 1, 1920
1,486,707
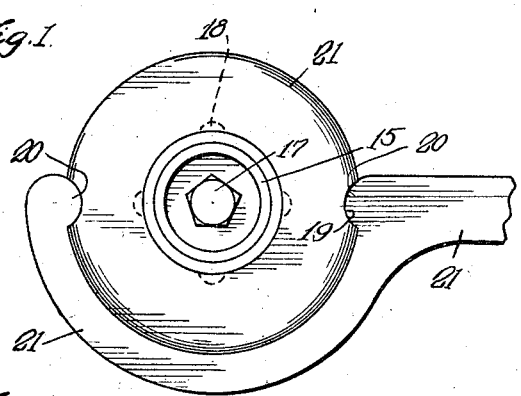
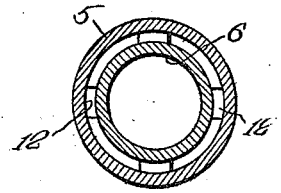
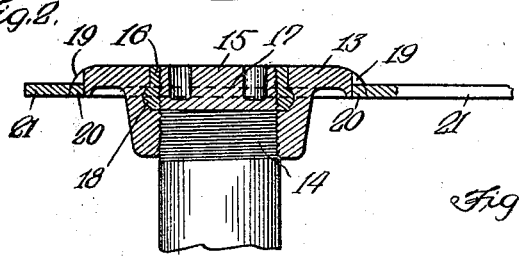
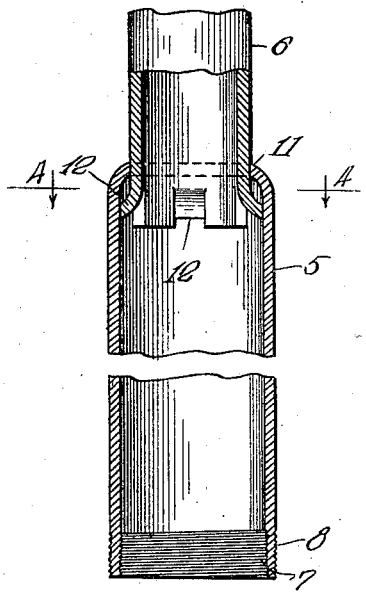
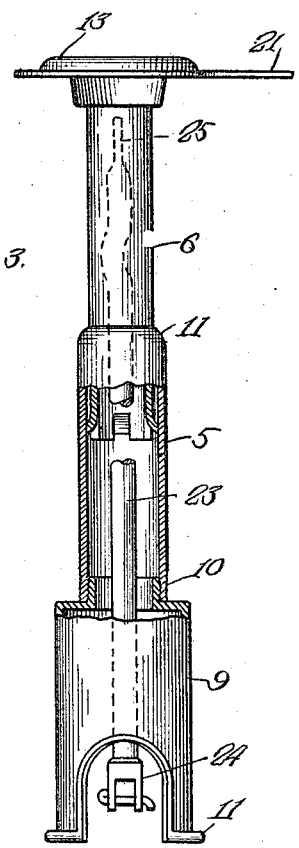
Inventor:
Arthur L. Warner Patented Mar. 11, 1924.

1,486,707

UNITED STATES PATENT OFFICE.

ARTHUR L. WARNER, OF ELGIN, ILLINOIS, ASSIGNOR TO ILLINOIS IRON AND BOLT COMPANY, OF CARPENTERSVILLE, ILLINOIS, A CORPORATION OF ILLINOIS.

GATE BOX.

Application filed March 1, 1920. Serial No. 362,436.

*To all whom it may concern:*

Be it known that I, ARTHUR L. WARNER, a citizen of the United States, residing at Elgin, in the county of Kane and State of Illinois, have invented certain new and useful Improvements in a Gate Box, of which the following is a specification.

This invention relates to gate boxes.

Gate boxes are extensively employed to provide ready access, by means of a suitable key or other tool, to service valves which, as in the case of water and gas systems, are often sunk in the ground.

The valves may be located at various distances below the ground level. Consequently gate boxes have heretofore been made in telescopically arranged sections so that the cover of the gate box can be located at the ground level regardless of the depth to which the valve has been sunk. Heretofore considerable difficulty has been experienced in the installation of telescopic gate boxes. During installation the sections will collapse together unless they are held in extended position. Various forms of packings and clamps have been proposed to hold the sections in the desired extended relation. Such expedients are relatively expensive and complicated.

One of the objects of this invention is to provide an improved telescopic gate box.

Another object is to provide a telescopic gate box whose sections are automatically held in extended relation without the use of packing or extraneous clamping devices and the like.

Another object is to provide a self sustaining telescopic gate box which is simple, reliable and inexpensive.

Another object is to provide an improved cap to close the ground surface end of the upper member.

Other, further and more specific objects of the invention will readily appear, to persons skilled in the art from a consideration of the following description when taken in conjunction with the drawings, wherein:—

Fig. 1 is a plan view of the device.

Fig. 2 is an elevation showing parts in sections.

Fig. 3 is a similar view of a modification, and

Fig. 4 is a section taken on line 4—4 of Fig. 2.

In all of the views the same reference characters are employed to indicate similar parts.

In making the box, I prefer to take two standard wrought iron pipe sections, 5 being the lower or base section and 6, the upper inner section. The pipe 6 being of such diameter that it may conveniently be inserted in the pipe 5.

The base section 5 may be screw threaded internally as at 7, or externally as at 8, for attachment to the bonnet of a service valve, or it may be connected to an auxiliary housing 9, as at 10, and the latter may be attached to the valve as by flange 11, or the like. The upper end of the section 5 is inturned or crimped inwardly, as at 11, to restrict the bore therethrough to substantially the same diameter as the external diameter of the upper, smaller section 6. This may be done conveniently by the use of a bull dozer, or other convenient tool. The inturned part 11, provides a guide bearing for the inner section 6 and it prevents the latter from being removed from the upper end of the base section 5.

Projecting laterally from the lower end of section 6 are outwardly turned tongues 12. These tongues have bearing on the inside surface of the section 5, and are sufficiently resilient to cause the two sections to remain in the positions in which they have been placed, because of the friction exerted between the tongues 12 and the inner surface of the section 5. When the section 6 is placed within the section 5, from the bottom end, if the tongues 12 do not make proper contact with the inner surface of the larger section, they may be slightly deflected by striking them a blow, or otherwise, until they bear with sufficient force on the inner surface of the larger section. The advantage of such a structure is to enable the upper section 6 to be and remain located at the proper height above the valve, so that the cap 13 will be retained at the proper height with respect to the ground surface after the soil is replaced after inserting the gate box.

The cap 13 is screwed firmly on to the upper screw threaded end 14, of the section 6, and in attaching the cap 13 to the upper end of the section 6, it is well to screw it firmly down to the shoulder of the thread and in some instances it may be necessary to paint the surface of the thread with some oxidizing solution, such as salammoniac, salt water, or the like, so that after the parts have been brought into contact, a film of rust will be formed in the contacting parts and render it substantially impossible to remove the cap 13 from section 6, so that when effort is made to remove the closure 15, from the cap 13, the cap will not be rotated with reference to the section. When the cap 13 is threaded, a tap may be run thru the cap and the brass ring 16. The brass ring 16 is inserted in the mold at the time the iron cap is molded, and a core may be made to take the place of the closure 15, so that if the brass 16 should melt, as a result from the heat from the molten iron, it will be confined and held in place and resume its former hardness as the cap and ring become cooled. The closure 15 is provided with an angular part 17, preferably five sided or pentangular in form so as to require a special wrench with which to remove the closure 15, or it may be provided with the usual openings for a spanner wrench, or other means for rotating the closure may be provided. The ring 16 is provided with projections 18 which become incorporated in openings formed in the cap 13 when the metal in the cap is poured around the ring 16, so that the ring will not be rotated when the closure 15 is removed from or placed in the end of the cap. The cap 13 has notches 19 in its sides for projections 20 of the spanner wrench 21.

To remove the closure 15, it is only necessary to put the spanner wrench in the position shown in Fig. 1, whereupon the closure may be rotated with the special wrench employed for that purpose. The use of the spanner wrench avoids the possibility of the section 6 being rotated when the closure is removed or placed in position to close the end thereof.

A key rod, or valve stem 23 is inserted in the gate box thus made and is provided on its lower end with a part 24 adapted to be secured to and rotate the valve to which the device is applied. When the closure is removed, a key may be inserted to engage the upper end 25 of the valve stem or the entire valve stem may be removed from the inside of the valve box.

While I have herein shown a single embodiment of my invention for the purpose of clear disclosure, it will be manifest to persons skilled in the art, that changes may be made in the general construction and arrangement of the parts within the scope of the appended claims.

Having described my invention what I claim as new and desire to secure by Letters Patent is:—

1. A gate box comprising two telescopically arranged pipe sections, the outer section having one of its end edges inturned to restrict the bore and the inner section being slightly smaller than the restricted bore and having outwardly projecting resilient tongues which engage the inner wall of the outer section to hold the two sections in any longitudinally extended position.

2. A gate box comprising two telescopically arranged pipe sections, the outer and larger section having one of its end edges inturned to restrict the bore and to provide an abutment and the inner section having an integral outwardly directed resilient tongue which frictionally engages the side wall of the outer section to hold the two sections in any extended relation and engages the abutment to prevent separation of the two sections.

In testimony whereof I hereunto subscribe my name.

ARTHUR L. WARNER.